United States Patent Office 3,502,056
Patented Mar. 24, 1970

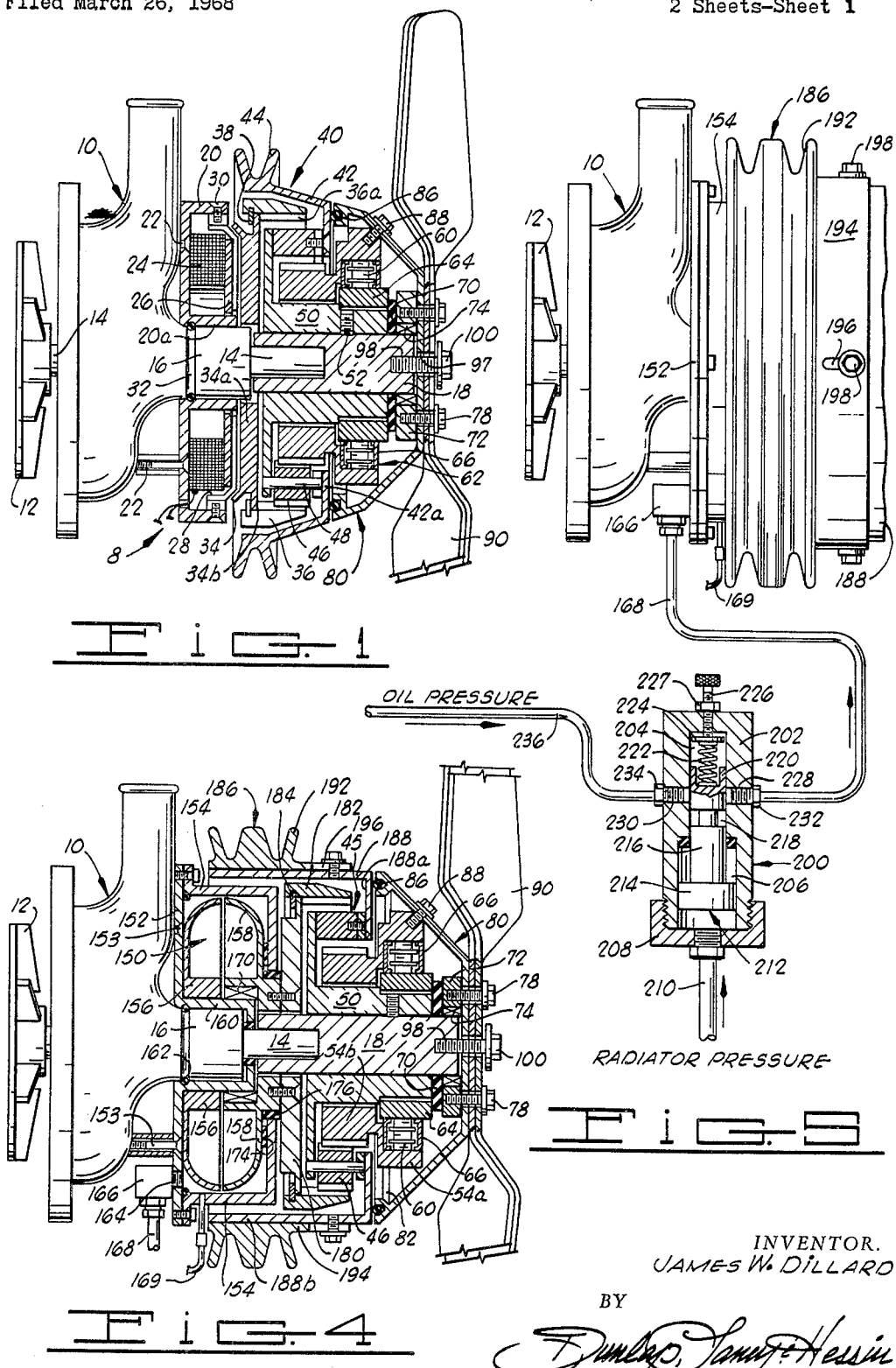

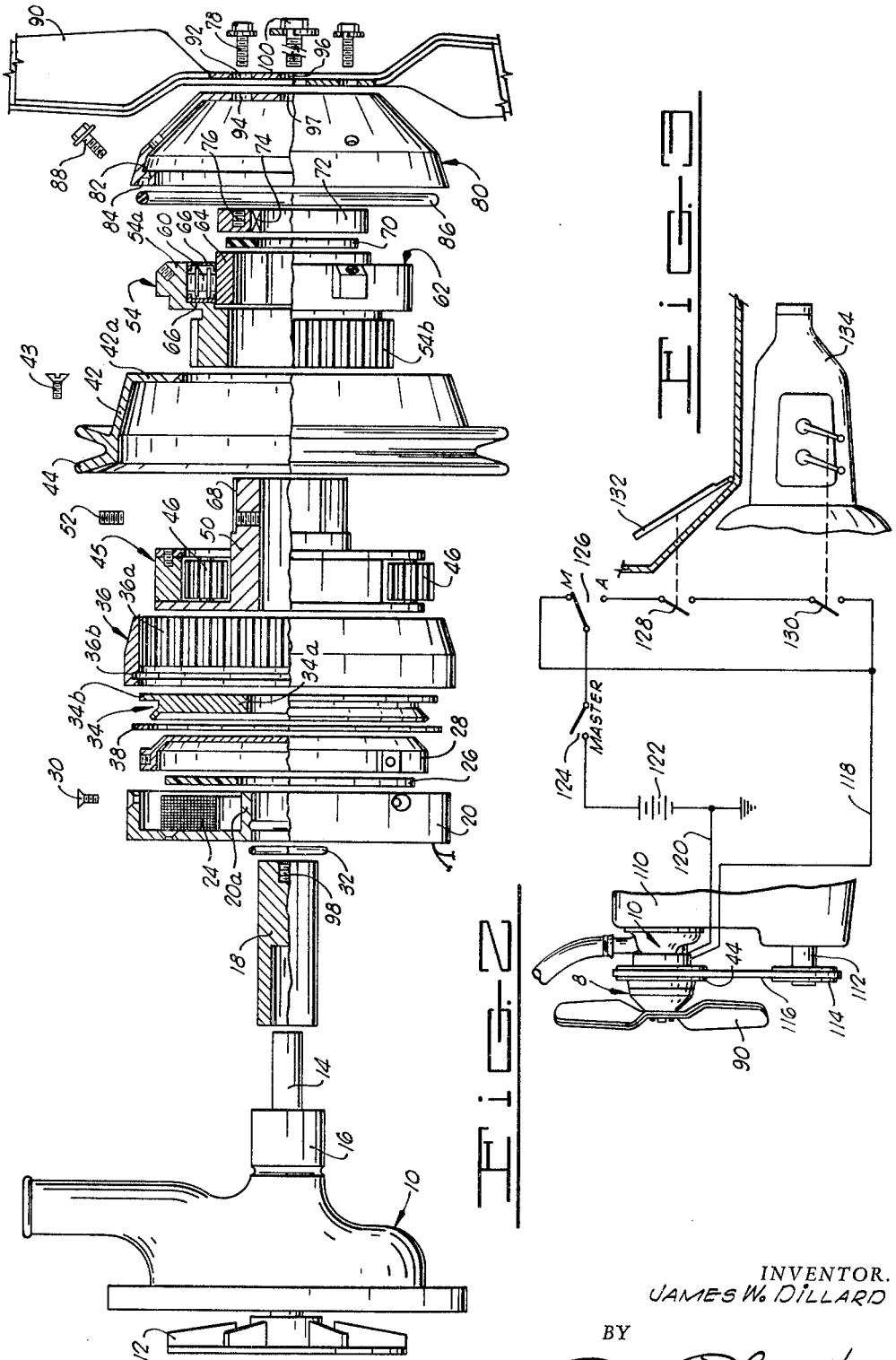

3,502,056
R.P.M. MULTIPLIER FOR AUTOMOBILE FAN
James W. Dillard, 346 S. Oak, Ponca City, Okla. 74601
Filed Mar. 26, 1968, Ser. No. 716,057
Int. Cl. F01p 7/04, 7/10
U.S. Cl. 123—41.11                    9 Claims

ABSTRACT OF THE DISCLOSURE

Apparatus for driving the fan blade of an automobile from the shaft of the engine driven water pump at the same or at a greater rotational speed than the speed of rotation of such shaft. The apparatus includes a planetary gear system interposed between the water pump shaft and the fan blade. A magnetic clutch or fluid coupling is energized manually or automatically when engine speed is low and arrests an outer ring gear of the planetary gear system. Through the planetary gear system, the result is to drive the fan blade at a substantially faster speed than the engine speed so that an enhanced cooling effect is obtained at this time. A fluid coupling may be substituted for the magnetic clutch and operated automatically in response to pressure within the radiator.

FIELD OF THE INVENTION

This invention relates to a cooling system of an automobile, and more particularly, to systems for causing the radiator fan of an automobile to turn at a different rate of rotational speed than the engine and water pump speed to enhance the effectiveness of air drawn across the radiator by the fan.

BACKGROUND OF THE INVENTION

According to certain automotive engineers and mechanics who have heretofore undertaken to develop improvements in the cooling systems of automobiles, it is desirable to drive the radiator fan of an automobile in a manner such that it at times rotates at the same speed as the engine, and at other times is disconnected from or not positively driven by the engine, or at still other times is caused to rotate faster than engine speed. Thus, for example, in U.S. Patent 2,807,246, it is proposed to completely disconnect the radiator fan from the driving shaft connected to the engine water pump of the automobile when the automobile is traveling at high speeds. This results in a saving of power at a time when the speed of the automobile is sufficiently high to result in the radiator being adequately cooled by natural air flow therethrough. Provision is further made to energize the magnetic clutch at high engine temperature and irrespective of engine speed to cause the fan to be driven in rotation with the water pump and at the speed of rotation of the drive shaft from the engine. The apparatus does not permit the fan to at any time be driven faster than the engine speed.

In U.S. Patent 1,422,426, a planetary gear system and a mechanical clutch are provided for permitting the radiator fan of an automobile to be directly driven from the engine at substantially the same speed as engine speed or, alternately, upon shifting of the clutch and setting of a brake band, to retain stationary the outer gear of the planetary system, and thus to permit the fan to be driven in a direction opposite the direction of rotation of the engine and at a higher speed than the engine speed. In this arrangement, the fan and water pump of the vehicle are always driven at the same speed and in the same direction.

Other patents which have given consideration to the problem of driving a cooling or radiator fan at variable speeds relative to the speed of rotation of the engine are U.S. Patent 2,516,200; U.S. Patent 3,211,136; U.S. Patent 2,402,951; and U.S. Patent 2,764,054.

BRIEF DESCRIPTION OF THE PRESENT INVENTION

The present invention provides a fan drive apparatus for automobiles, which apparatus is useful for permitting automatic or manual control of the rotational speed at which the radiator fan of the automobile is driven. The structure differs from prior art constructions of this general type in its simplicity and economy of construction, its versatility in mode of control, and its positive unidirectional drive of the fan. Broadly, described, the invention comprises a water pump having a driving shaft projecting therefrom; a magnetic clutch assembly secured to the water pump housing and surrounding the driving shaft and a planetary gear system which includes a central sun gear, a plurality of orbital planet gears, and an outer ring gear which is arrestable by energization of the magnetic clutch. The orbital planet gears, which mesh with the outer ring gear and the central sun gear, are carried on a planet carrier which is keyed to a shaft extension element secured to and rotatable with the water pump shaft. A pulley hub is secured to the planet carrier for rotation with the planet carrier, shaft extension element and water pump shaft. The sun gear is secured to a fan hub which carries the radiator fan, and a sprag assembly is interposed between the sun gear and the shaft extension element and/or the planet carrier to assure unidirectional rotation of the fan, fan hub and sun gear.

BRIEF DESCRIPTION OF THE DRAWINGS

FIGURE 1 is a view, partially in section and partially in elevation, of one embodiment of the fan drive system of the present invention.

FIGURE 2 is an exploded view of the embodiment of the invention illustrated in FIGURE 1.

FIGURE 3 is a schematic view illustrating that portion of the invention depicted in FIGURE 1 in combination with other elements.

FIGURE 4 is a view, partially in section and partially in elevation, and thus similar to FIGURE 1, but illustrating a second embodiment of the fan drive system of the invention.

FIGURE 5 is a view, partially in elevation and partially in section, illustrating additional structural elements employed in combination with the embodiment of the invention depicted in FIGURE 4.

DETAILED DESCRIPTION OF PREFERRED EMBODIMENTS OF THE INVENTION

Referring initialy to FIGURE 1 of the drawings, the fan drive assembly of the invention is designated generally by reference numeral 8. A water pump utilized to circulate a coolant liquid to an internal combustion engine of the type utilized in an automobile is designated generally by reference numeral 10. The water pump 10 includes an impeller blade 12 which is keyed to, and driven by, a shaft 14 which extends through the housing of the water pump to the opposite side thereof, and is shown projecting forwardly from the water pump. The shaft 14 projects through a hub 16 of the water pump, and is pressed into a bore in a shaft extension element 18.

A magnetic clutch housing 20 which is provided with an opening through the center thereof is positioned around the hub 16 of the water pump 10 and is bolted to the water pump housing by means of bolts 22. Positioned inside the magnetic clutch housing 20 is a stationary solenoid winding 24 which surrounds an annular magnetic core (not seen). A gasket 26 is interposed between the stationary solenoid winding 24 and a tapered metal shield 28 of magnetic material. The tapered metal shield 28 is secured by screws 30, or in any other suitable manner, to the inside of the clutch housing 20, and thus retains the gasket 26 and stationary solenoid winding 24 in their illustrated position within the clutch housing. It will be noted that the clutch housing 20 includes an axially extending sleeve portion 20a which fits closely around the hub 16 and is sealed thereagainst by means of a suitable O-ring seal 32.

Positioned adjacent, but slightly spaced from the tapered metal shield 28 is a frusto-conical outer clutch element 34 which includes a radially inwardly extending, centrally apertured plate portion 34a which loosely surrounds the hub 16. The outer clutch element 34 also has a radially outwardly extending flange 34b which is dimensioned to be press fitted inside of an outer ring gear designated generally by reference numeral 36. The outer ring gear 36 includes a series of gear teeth 36a (see FIGURE 2), and an annular groove 36b which is adapted to receive a snap ring 38 which snaps into the groove 36b and retains the outer clutch element 34 in the position depicted in FIGURE 1.

The outer ring gear 36 is positioned inside of, and spaced slightly from, a pulley assembly which is designated generally by reference numeral 40, and which includes a hub portion 42 which has formed integrally therewith, or secured thereto, a V-channel pulley 44. The hub portion 42 includes a radially inwardly extending portion 42a (see FIGURE 2) which is secured by means of suitable screws 43 to a planet carrier designated generally by reference numeral 45. The planet carrier 45 journals a plurality of pinion or planet gears 46 on stub shafts or axles 48. The planet gears 46 mesh with the teeth 36a of the outer ring gear 36. Included as a portion of the planet carrier 45 is a hub portion 50 which extends coaxially around and along the shaft extension element 18, and is keyed to the shaft extension element by means of set screws 52, or other suitable means, so that the planet carrier 45 and the planet gears 46 are rotated with the shaft extension 18, and thus with the shaft 14 of the water pump 10.

A sun gear assembly is designated generally by reference numeral 54 and includes an annular sprag-receiving sleeve portion 54a and an annular sun gear portion 54b. The sun gear portion 54b of the sun gear assembly 54 extends coaxially around the hub portion 50 of the planet carrier 45, and inside the planet gears 46 so that the planet gears mesh with the teeth of the sun gear 54b. Disposed inside the sprag-receiving sleeve 54a is the outer race 60 of a sprag unit designated generally by reference numeral 62. An inner race 64 of the sprag unit 62 is pressed over the hub 50 of the planet carrier 45. The outer race 60 of the sprag unit 62 is retained in position by means of a pair of thrust washers 66. The inner sprag race 64 is keyed in any suitable manner to the hub 50 of the planet carrier 45, such as by the axial spline 68 depicted on the hub. It will be noted in referring to FIGURE 1 that the radially inner surface of the sun gear assembly 54 is spaced slightly from the adjacent surface of the hub 50 of the planet carrier 45, so that the sun gear is actually supported by, or carried by the sprag unit 62.

A gasket 70 is interposed between the end of the planet carrier hub 50, the inner race 64 of the sprag unit 62 and an annular bolt flange 72. Pressed into a large aperture in the center of the bolt flange 72, and surrounding the shaft extension 18 is a sealed bearing 74. The sealed bearing 74 permits the bolt flange 72 to turn freely on the shaft extension element 18. Spaced radially outwardly from the sealed bearing 74, and circumferentially from each other in the bolt flange 72, are a plurality of threaded holes 76 which are used to receive a plurality of threaded fan bolts 78 in a manner hereinafter explained in greater detail.

A fan hub, designated generally by reference numeral 80, has an inwardly extending flange 82 which is provided with an annular groove 84 which receives an annular O-ring seal 86. The fan hub 80 is bolted to the sprag-receiving sleeve portion 54a of the sun gear assembly 54 by means of suitable screws or bolts 88 in the manner best illustrated in FIGURE 1, and in this position, a seal is established between the pulley hub 42 and the fan hub 80 by means of the O-ring seal 86. The O-ring seal 86 is preferably constructed of Teflon, nylon, or other synthetic resin having a relatively low coefficient of friction since the fan hub 80 will, at times, be rotating relative to the pulley hub 42, as hereinafter described.

A fan blade 90 is provided with a plurality of bolt holes 92 which, when the fan blade is secured to the fan hub 80 as depicted in FIGURE 1, are aligned with a plurality of registering bolt apertures 94 formed in the closed end portion of the fan hub 80. The threaded bolts 78 are extended into, and threadedly engaged with, the threaded holes 76 in the bolt flange 72 through the bolt holes 92 and 94 in the fan blade 90 and the fan hub 80, respectively. An aperture 96 is provided in the center of the fan blade 90 and in the center of the closed end of the fan hub 80 in alignment with a bore 98 formed in the end of the shaft extension element 18. A cap screw 100 is then extended through the central aperture 96, and through the central aperture 97 in the fan hub, and is threadedly engaged with the threaded bore 98 in the shaft extension element 18. The cap screw prevents the fan hub 80 and bolt flange 72 from being pulled forward and disconnected from the assembly by the pull developed by the fan during operation of the assembly.

FIGURE 3 of the drawings illustrates the manner in which the fan drive assembly depicted in FIGURES 1 and 2, and heretofore described, is connected in suitable electrical circuitry to facilitate manual and automatic operation of the fan drive assembly during the operation of the automobile. As depicted in FIGURE 3, the fan drive assembly 8 is shown as secured through the water pump 10 to the engine block 110 of the automobile. As in conventional construction, a shaft 112 driven by the engine during its operation projects from the front of the engine block and carries a pulley 114. The pulley 114 drives a V-belt 116 which is passed around the pulley 44 in driving engagement therewith. Extending from the stationary solenoid windings 24 of the magnetic clutch are a pair of electrical leads 118 and 120. The electrical lead 120 is shown as grounded, as is one side of a storage battery 122. The hot lead 118 is branched to provide parallel circuits, one of which includes a master switch 124 and a manual-automatic control switch 126. The other parallel circuit includes both the master switch 124 and the manual-automatic control switch 126 and, in addition, includes an accelerator switch 128 and a transmission responsive switch 130. The accelerator switch 128 is mechanically connected to an accelerator pedal 132 of the automobile so that when the accelerator is depressed to cause the engine of the automobile to be driven at a faster speed, the accelerator switch 128 is opened. The transmission responsive switch 130 is mechanically or hydraulically connected to the transmission 134 of the automobile so that this switch is closed at such time as the automobile is shifted into low gear. The method of connection of the transmission responsive switch 130 to the transmission 134 of the automobile so that this switch will be closed when the automobile is driven in low gear, or its equivalent (developing low engine speed) will vary from model to model, and with respect to the different makes of automobiles. The manner is which the transmission responsive switch 134 is actuated is not critical to the invention, provided only that it be responsive to shifting of the automobile into low gear to become closed.

OPERATION OF THE FIGURE 1 EMBODIMENT OF THE INVENTION

One objective of the employment of the fan drive system of the invention is to drive the radiator fan blade 90 at the same speed as the water pump 10, and in direct relation to the speed of the engine at such time as the engine is running at relatively high speed. At this time, due to the relatively high speed of the engine, the fan may turn at this speed and provide adequate cooling by drawing an ample volume of air through the radiator to efficiently cool the water being circulated therethrough. At such time as the engine is idling, or running at a speed equivalent to that at which it runs in low gear, and the accelerator is not depressed, the fan drive system of the invention effectively causes the fan to turn at a speed which is substantially faster than that at which the water pump is driven. Ratios of from two to one upwardly (fan rotational speed to water pump rotational speed) can be obtained through the use of the system. After the automobile is started up by turning the ignition switch to the ON position, the driver is ready to drive away from a standing position. The accelerator has not yet been depressed, and the engine is running at idling speed. At this time, the electrical circuit which includes the storage battery 122, the master switch 124, the manual-automatic control switch 126, accelerator switch 128, the transmission responsive switch 130 and the magnetic clutch can be energized only if the operator has elected to close the master switch 124. If this electrical circuit is open, the magnetic clutch is not energized, and there is no frictional engagement between the tapered metal shield 28 and the frusto-conical outer clutch element 34. The outer ring gear 36 is thus free to turn.

As the pulley 44 is driven in rotation by the belt 116 from the idling engine, the pulley hub 42 is also rotated, and by virtue of its securement to the planet carrier 45, the planet carrier is caused to rotate. Rotation of the planet carrier 45 causes the planet gears 46 to rotate in a path around the shaft extension element 18, and these planet gears, during their rotation, engage both the sun gear 54b and the outer ring gear 36. Since the outer ring gear is, at this time, free to rotate, the sun gear will be driven in rotation at the same speed as the speed of rotation of the pulley 44 and the planet carrier 45. The sun gear 54b is secured through the sprag-receiving sleeve 54a to the fan hub 80, which is, in turn, secured to the fan 90 so that the fan 90 is driven at the same speed as the sun gear. The fan 90 is thus driven at the same speed as the pulley 44 and is directly driven from the engine of the automobile. Since the sleeve 50 of the planet carrier 45 is keyed to the shaft extension element 18 by means of the set screws 52, the shaft extension element is also driven at the same speed as the sun gear 54b and the fan blade 90. Thus, the water pump 10 is driven at the same speed of rotation as the fan blade 90.

If the operator should choose to make use of the fan drive system of the invention for driving the fan blade 90 at a different speed from the engine speed and the water pump speed, the master switch 124 is first closed, and then the operator chooses whether he will manually operate the fan drive system or place it in automatic operation. Assuming initially that he elects to operate the fan drive system in manual drive, the manual-automatic control switch is moved to the manual position in which it is depicted in FIGURE 3. In this position, an electrical circuit is made from the storage battery 122 through the master switch 124 and the manual-automatic control switch 126 to the stationary winding 24 of the magnetic clutch.

Energization of this winding magnetizes the tapered metal shield 28 and draws the outer frusto-conical clutch element 34 against this metal shield. Frictional engagement occurs between the outer clutch element 34 and the tapered metal shield 28 so that the outer ring gear 36 is held stationary and cannot rotate. As a result of the inability of the outer ring gear 36 to rotate at this time, the planet gears 46 carried by the planet carrier 45 are caused to rotate about the stub shafts 48 as the planet carrier 45 is rotated. Thus, although the planet carrier 45 is rotated at the same speed as the pulley 44 and the pulley hub 42, the sun gear 54b is actually rotated substantially faster than the planet carrier 45 or the pulley 44, since the planet gears 46 individually rotate, and additionally, are caused to revolve, along with the planet carrier, about the axis of the shaft extension element 18. The rotational speed of the sun gear 54b is thus effectively multiplied with respect to the speed of the pulley 44, and this, in turn, drives the fan blade 90 at such multiplied speed through the connection of the sprag-receiving sleeve 54a to the fan hub 80. The shaft extension element 18 and shaft 14 continue to rotate, however, at the same speed as the pulley 44, since the sleeve 50 of the planet carrier is rotated at the same speed as the pulley, and is keyed to the shaft extension element 18. Thus, the water pump 10 continues to be driven directly from the engine, and at substantially the same speed as the engine, while the speed of the fan blade 90 is multiplied through the planetary gear system.

Let it now be supposed that the operator desires to place the system in automatic operation rather than manual. The master switch 124 remains closed, and the operator shifts the manual-automatic control switch 126 to the automatic position as indicated by the contact marked A in FIGURE 3. With the switch 126 thus positioned, a circuit is completed to the solenoid winding 24 of the magnetic clutch at such time as the accelerator pedal 132 is not depressed to drive the engine at high speed, and at such time as the transmission of the automobile is in low gear. When these two conditions appertain, the accelerator switch 128 is closed, as is the switch 30 which is responsive to the status of the transmission system of the automobile. Energization of the stationary solenoid winding 24 of the magnetic clutch results in the fan blade 90 being turned at a substantially higher speed than the pulley 44 is turned, and than the water pump 10 is rotated, as hereinbefore explained. When the operator accelerates the automobile, the engine is driven at a faster speed, and thus there is no need, in order to achieve adequate cooling, to multiply the speed at which the fan blade 90 will turn. Thus, depression of the accelerator pedal 132 opens the accelerator switch 128 and interrupts the electrical circuit to the magnetic clutch. De-energization of the magnetic clutch will release the outer ring gear 36 in the manner which has heretofore been described, and will thus permit the fan blade 90 to turn at the same speed as the pulley 44, the shaft extension element 18, the shaft 14, and the water pump 10.

There will, of course, be occasions when the accelerator pedal 132 is released even though the automobile is traveling at high speed, and the engine is therefore correspondingly turning over at a high speed. This might occur, for example, at a time when the automobile operator had been driving at a high speed but wishes to permit the automobile to gradually decelerate due to the drag on the engine. At this time, the accelerator pedal 132 would be released and the accelerator switch 128 would be closed. The circuit to the magnetic clutch, however, will remain open because of the fact that the transmission of the automobile would still be in high gear, and the transmission responsive switch 130 would be open.

EMBODIMENT OF THE INVENTION
DEPICTED IN FIGURES 4 AND 5

Since many of the structural elements used in this alternate embodiment of the invention are identical to those which have been described in referring to the embodiment of the invention appearing in FIGURES 1 to 3, identical reference numerals will be utilized to identify such identical elements, and their arrangement in the combination, and their function, will not again be described in detail. Referring initially to FIGURE 4 of the drawings, the magnetic clutch which was employed in the FIGURES 1–3 embodiment of the invention has here been replaced by a fluid clutch or coupling designated generally by reference numeral 150. The fluid clutch 150 includes a housing having a face plate 152 secured by bolts 153, or other suitable means, to the housing of the water pump 10. A cover plate 154 is bolted, or otherwise suitably secured, to the face plate 152 to form an enclosure which houses a pair of opposed or facing annular toruses 156 and 158. Each of the toruses contain radial vanes so that the toruses act as impellers in a manner well known in the art of fluid transmission systems and the like. For purposes of clarity of description, the torus 156 will be hereinafter referred to as the forward torus, and the torus 158 will be referred to as the rear torus. These toruses are spaced apart slightly so as to afford clearance, and allow the rear torus to rotate independently of the forward torus. Each of the toruses is mounted on a hub portion 160 which is secured to the face plate and sealed against the hub 16 of the water pump 10 by means of a suitable O-ring seal 162. It will be noted in referring to FIGURES 4 and 5 that a fluid port 164 is provided in the face plate 152 and is connected to a fitting 166 into which a driving or coupling fluid is delivered by a conduit 168 in a manner, and for a purpose, hereinafter described in greater detail. A restricted flow, fluid return line 169 is also provided, and communicates through the cover plate 154 with the interior of the fluid coupling for returning fluid from this coupling to the transmission.

As has been previously indicated, the torus 158 is freely rotatable on the hub 160, and to this end, a bearing 170 and thrust bearing 174 are provided. A fluid seal is established between the rear torus 158 and the radially inwardly extending portion of the cap plate 154 by means of a sealing element 176. A radially inwardly extending portion of the rear torus 158 is bolted or otherwise suitably secured to a plate 180 which is pressed into an outer ring gear 182 and retained in the outer ring gear by means of a snap ring 184. The fit of the plate 180 in the gear ring 182 is such that the plate and gear ring turn together.

The remainder of the fan drive apparatus depicted in FIGURE 4 is substantially the same as that depicted in FIGURE 1 except for the construction of the pulley assembly utilized in the FIGURE 4 embodiment. As depicted in the drawings, a pulley assembly is designated generally by reference numeral 186, and includes a hub 188 which has a radially inwardly extending portion 188a and an axially extending portion 188b. The radially inwardly extending portion 188a of the hub 188 is bolted or otherwise suitably secured to the planet carrier 45 which is identical to the planet carrier depicted in FIGURES 1 and 2. Adjustably mounted on the axially extending portion 188b of the hub 188 is an annular, double V-tracked pulley 192 which includes elements forming a pair of V-shaped channels to receive a pair of V-belt elements useful for driving the fan drive mechanism, and also for driving from this mechanism, a generator, air conditioner or other accessory of the automobile. The double V-tracked pulley 192 has extending axially therefrom, an annular securing flange 194 which is provided with a plurality of circumferentially spaced, axially extending bolt slots 196 (see FIGURE 5). The bolt slots 196 permit securing bolts 198 to be extended through the axially extending annular securing flange into the axially extending portion 188b of the hub 188. By loosening the securing bolts 198 slightly, the double V-tracked pulley and its annular securing flange 194 may be slid in an axial direction so as to permit the V-tracked pulleys to be brought into better alignment with the pulley 114 (see FIGURE 3), and any other elements to which it may be desired to extend the second belt which can be accommodated by the pulley.

Referring now to FIGURE 5 of the drawings, it will be perceived that in operatively connecting the fan drive assembly depicted in FIGURE 4 to other operating elements of the automobile, the conduit 168 is connected to a pressure control valve designated generally by reference numeral 200. The pressure control valve 200 includes a body 202 which is provided with a bore 204 and a counterbore 206. The end of the body in which the counterbore 206 is formed is externally threaded and receives a threaded connection cap 208 to which a pressure line 210 may be connected in the manner illustrated. The pressure line 210 is extended to and connected with the radiator (not shown) of the automobile so that pressure developed within the radiator due to the heating of the cooling fluid used in the automobile will be transmitted through the pressure line 210 to the pressure control valve 200.

Positioned within the hollow interior of the body 202 of the pressure control valve 200 is a piston assembly designated generally by reference numeral 212. The piston assembly 212 includes a piston head 214 which has extending from one side thereof a shank portion 216. The shank portion 216 is deeply grooved with an annular by-pass slot 218 and is provided with a small spring-receiving bore 220 at its end opposite the end secured to the piston head 214. The spring-receiving bore 220 accommodates one end of a compression spring 222 which bears at its other end against a spring retainer cap 224 secured to the end of an adjustment screw 226 which is located inside the bore 204. The opposite end of the adjustment screw 226 is knurled and the adjustment screw is threaded to a bolt 227 or other suitable threaded member secured on the body 202 of the pressure control valve 200. The body 202 of the pressure control valve 200 has extending radially therethrough and in communication with the bore 204, a pair of radial ports 228 and 230, which ports threadedly receive fittings 232 and 234, respectively. The fitting 232 threadedly engages one end of the conduit 168, and the fitting 234 threadedly engages the end of an oil pressure feed conduit 236. The oil pressure feed conduit 236 is adapted to be connected to any portion of the engine or transmission of the automobile which carries oil under pressure, so that such oil can be transmitted through the conduit 236 to the pressure control valve 200.

OPERATION OF THE EMBODIMENTS OF THE INVENTION DEPICTED IN FIGURES 4 AND 5

The fan drive assembly depicted in FIGURES 4 and 5 is bolted to the housing of the water pump 10 in the manner hereinbefore described by means of the bolts 153 extended through the face plate 152 into this housing. A suitable V-belt is connected between one of the V-shaped channels of the double V-tracked pulley and the pulley 114 driven from the engine 110 by means of the shaft 112. With the assembly depicted in FIGURES 4 and 5, the double V-tracked pulley 192 will be driven in rotation by the engine due to the described connection using the V-belt drive. As the pulley 192 is rotated, the planet carrier 45 is also rotated due to its rigid connection with the hub 188 of the pulley assembly 186. Rotation of the planet carrier 45 results in a consequent revolution of the several planet gears 46 about the axis of the shaft extension element 18.

Let it be assumed initially that the outer ring gear 182 is permitted to rotate freely due to complete freedom of rotation of the torus 158 on its bearing 170. Rotation of the planet carrier 45 by the concurrent rotation of the double V-tracked pulley 192 will cause the outer ring gear 182 to rotate at a speed substantially equivalent to that of the planet carrier and the pulley. For this reason, the planet gears 46 will not rotate about their respective shafts 48 at this time, but will simply provide an interlock or interconnection between the rotating planet carrier 45 and the outer ring gear 182. Since the planet gears 46 do not rotate at this time, they also act as a rigid or unyielding connection to the sun gear 54b with the result that the sun gear is rotated directly with the planet carrier 45 and makes one revolution for each revolution made by the planet carrier. There is thus established at this time, a direct drive between the double V-tracked pulley 192 and the fan blade 90 in substantially the same manner as has hereinbefore been described in referring to FIGURES 1–3. As previously indicated, the sprag assembly 62 prevents reverse rotation of the fan blade 90.

Let it now be assumed that a large volume of oil under pressure is introduced to the fluid clutch 150 so as to completely fill the space between the forward torus 156 and rear torus 158 with oil under pressure. This fluid coupling which results from such filling imposes a severe drag on the rear torus 158 tending to arrest its movement, the magnitude of which, of course, depends upon the amount and pressure of the oil introduced to the fluid coupling 150. Assuming that maximum coupling is effected, and that the rear torus 158 is slowed to a maximum degree, the effect of such coupling is to retard to a maximum degree the movement of the outer ring gear 182 to which the clutch plate 180 is secured.

As the outer ring gear 182 is slowed down, the planet gears 46 commence to rotate about the stub shafts 48 as a result of the rotation of the planet carrier 45. Rotation of the planet gears 46 conjunctively with rotation of the planet carrier 45 causes the sun gear 54b, which is in mesh with the planet gears 46, to rotate at a substantially higher speed than the planet carrier and double V-tracked pulley 192. Thus, the fan blade 90 is being driven at a substantially higher speed of rotation at this time than is the pulley 192, or the water pump 10 which is keyed through the shaft extension element 18 to the planet carrier 45.

FIGURE 5 illustrates the manner in which the embodiment of the invention employing the fluid clutch 150 may be used to best advantage. For the purpose of supplying oil under pressure to the fluid clutch 150, oil is directed from the main line pressure of the automatic transmission of the automobile through the conduit 236, the control valve 200 and the conduit 168 to the fluid clutch 150. It should be mentioned that oil for operating the fluid clutch 150 can also be derived from the motor through line 236 if more suitable. The fluid pressure control valve 200 functions to control the amount and pressure of fluid introduced to the fluid coupling 150. Thus, with the pressure control valve 200 in the position illustrated in FIGURE 5, a relatively large diameter portion of the shank portion 216 of the piston assembly 212 is positioned in the bore 204 so that it covers the radial ports 228 and 230, and no oil can pass through the control valve. Thus, little or no coupling exists between the toruses 156 and 158 of the fluid clutch 150, and the outer ring gear 182 is permitted to turn freely as has been hereinbefore described. The return line 169 functions to permit fluid to return from the fluid clutch 150 to the automatic transmission or motor.

As pressure in the radiator of the automobile builds up due to heating of the water or other coolant fluid utilized in the cooling system of the automobile, this pressure is transmitted through the pressure line 210 to the interior of the body 202 of the pressure control valve 200. The pressure act against the head 214 of the piston assembly 212 to force the piston assembly further into the bore 204 against the bias of the compression spring 222. As the shank 216 of the piston assembly 212 moves into the bore 204 to further compress the compression spring 222, a portion of the annular by-pass slot 218 moves into alignment with the radial ports 228 and 230. This will permit a small amount of oil to pass through the pressure control valve 200 into the conduit 168 and ultimately into the fluid clutch 150 between the toruses 156 and 158. Thus, a drag will be exerted on the rear torus 158 which will, in turn, slow down the outer ring gear 182. To the extent that the outer ring gear 182 is retarded in its rotational movement, the planet gears 46 will be caused to rotate about their stub shafts 48, and the sun gear 54b and the fan blade 90 which is connected thereto through the intervening structure will be caused to rotate relatively faster than when no coupling exists between the forward torus 156 and rear torus 158.

If the coolant material utilized in the automobile becomes heated to a higher temperature, and pressure in the radiator therefore builds up even more, the piston assembly 212 will be forced further into the bore 206 and counterbore 204 with the result that a larger portion of the annular by-pass slot 218 will be brought into alignment with the radial ports 228 and 230. This will, in turn, permit more oil to pass through the pressure control valve 200 and be directed into the fluid clutch 150 via the conduit 168. More effective coupling between the forward torus 156 and 158 will therefore result with the further result that the outer ring gear 182 will be further retarded in its rotational speed, and the planet gears 46 will be caused to rotate about their stub shafts 48 even faster. This will, in turn, speed up the sun gear 54b and cause the fan blade 90 to rotate at a faster rate of speed relative to the rate of rotation of the double V-tracked pulley 192. It will be perceived from the description of the operation of the embodiment of the invention depicted in FIGURES 4 and 5 that the amount by which the fan blade 90 is speeded up in its rotational movement is directly related to the extent to which the coolant medium used in the automobile may be heated, and thus require more efficient cooling. Thus, ultimately, in its most effective cooling operation, no significant obstruction to the passage of oil under pressure from the conduit 236 through the control valve 200 to the conduit 168 is encountered, and the most complete coupling is effected between the forward torus 156 and the rear torus 158 of the fluid clutch 150. At this time, rotational movement of the outer ring gear 182 is greatly arrested, and the fan blade 90 is turning at its greatest rotational speed relative to the rotational speed of the double V-tracked pulley 192.

From the foregoing description of the invention, it will have become apparent that the present invention provides an improved fan drive system for use on automobiles for the purpose of permitting the radiator fan blade to be driven at a relatively high speed at such time as the cooling requirements of the automobile are greatest. Although certain preferred embodiments of the invention have been herein described in order to provide an example of how the invention may be constructed and used, it is to be understood that various changes and modifications in the described structure and mode of use can be effected without departure from the basic principles which underlie the invention.

What is claimed is:

1. A fan drive mechanism for an automobile comprising:

an engine;
a shaft drivingly connected to the engine;
pulley means including a pulley and a hub supporting the pulley;
means drivingly interconnecting said shaft and said pulley;
a water pump having a pump shaft extending therefrom;
a shaft extension element drivingly conected to said water pump by frictional securement to the shaft extending from the water pump;
a planetary gear system including a sun gear, an outer ring and at least one planet gear interposed between the ring gear and the sun gear;
a planet carrier rotatably supporting said planet gears and connected to said pulley hub for rotation therewith;
clutch means secured to said water pump and having a movable element secured to said ring gear for arresting rotation of said ring gear;
a fan blade;

a fan hub secured to said fan blade and to said sun gear for concurrent rotation of the fan hub, fan blade and sun gear;

means keying said planet carrier to said shaft extension element; and a sprag interposed between said sun gear and said shaft extension element for preventing rotation of said sun gear, fan hub and fan blade in one direction and permitting rotation thereof in the opposite direction.

2. A fan drive mechanism as defined in claim 1 wherein said clutch means is a magnetic clutch.

3. A fan drive mechanism as defined in claim 1 wherein said shaft extension element has a bore in one end thereof frictionally receiving said pump shaft so that said extension element turns with said pump shaft by reason of said frictional engagement.

4. A fan drive mechanism as defined in claim 1 wherein said pulley is adjustably secured to said pulley hub for adjustment of its position on said hub in an axial direction with respect to said shaft extension element.

5. A fan drive mechanism as defined in claim 1 wherein said clutch means is a fluid clutch.

6. A fan drive mechanism as defined in claim 5 and further characterized to include:
a source of fluid;
conduit means connecting said source of fluid to said fluid clutch;
a pressure responsive flow control valve in said conduit means;
means for connecting said flow control valve to the radiator of the automobile for conveying a fluid under pressure to said flow control valve.

7. A fan drive mechanism as defined in claim 5 wherein said fluid clutch comprises a pair of opposed toruses adapted to be coupled by a fluid positioned therebetween.

8. A fan drive mechanism as defined in claim 1 and further characterized to include:
means for manually engaging said clutch means for arresting motion of said ring gear; and
means for automatically engaging said clutch means when said engine drives said first shaft in the lower portion of the range of speed at which said engine is capable of driving said first shaft.

9. A fan drive mechanism as defined in claim 8 wherein said clutch means is a magnetic clutch, and
said means for automatically engaging said magnetic clutch comprises:
an accelerator pedal;
a first switch operably connected to said pedal for opening when said pedal is depressed to increase engine speed, and closing when said pedal is released to decrease engine speed;
a second switch connected in electrical series with said first switch and adapted for connection with the transmission system of the automobile for closure when the automobile is in a selected gear;
a source of electrical current; and
an electrical circuit interconnecting said magnetic clutch, first and second switches and source of electrical current.

References Cited

UNITED STATES PATENTS 3,270,588    9/1966    Bowen et al. _____ 123—41.12

FOREIGN PATENTS 597,193    3/1946    Great Britain.
824,783    9/1955    Great Britain.
1,131,946    6/1962    Germany.

OTHER REFERENCES

SEA Journal Publication, October 1956, pp. 66–70 incl.

MARK M. NEWMAN, Primary Examiner

U.S. Cl. X.R

123—41.12